United States Patent [19]

Sobajima et al.

[11] Patent Number: 5,484,835

[45] Date of Patent: Jan. 16, 1996

[54] HEAT-RESISTANT, PROPYLENE RESIN-BASED MOLDING MATERIALS AND MOLDED PRODUCTS OBTAINED THEREFROM

[75] Inventors: Yoshihiro Sobajima; Satoru Kinoshita; Masahide Hamaura, all of Yokkaichi, Japan

[73] Assignee: Mitsubishi Chemical Corporation, Tokyo, Japan

[21] Appl. No.: 251,359

[22] Filed: May 31, 1994

[30] Foreign Application Priority Data

May 31, 1993 [JP] Japan .................. 5-129092

[51] Int. Cl.$^6$ .................. C08K 7/14; C08K 3/40
[52] U.S. Cl. .................. 524/494; 524/504; 523/206; 523/207; 525/71; 525/74; 525/78
[58] Field of Search .................. 524/494, 504; 523/206, 207

[56] References Cited

U.S. PATENT DOCUMENTS

| | | | |
|---|---|---|---|
| 4,433,073 | 2/1984 | Sano et al. | 523/206 |
| 4,663,369 | 5/1987 | Kawai et al. | 523/206 |
| 4,694,031 | 9/1987 | Morita et al. | 524/494 |
| 4,891,392 | 1/1990 | Abe et al. | 523/206 |
| 4,983,647 | 1/1991 | Ueno et al. | |
| 4,997,875 | 3/1991 | Geddes et al. | 524/504 |
| 5,082,893 | 1/1992 | Asanuma et al. | 524/504 |
| 5,087,654 | 2/1992 | Harada et al. | 524/504 |
| 5,264,174 | 11/1993 | Takei et al. | 524/494 |
| 5,296,186 | 3/1994 | Sobajima et al. | |

FOREIGN PATENT DOCUMENTS

| | | |
|---|---|---|
| 0201367 | 12/1986 | Germany . |
| 1094439 | 12/1967 | United Kingdom . |
| 1302048 | 1/1973 | United Kingdom . |

*Primary Examiner*—Carman J. Seccuro, Jr.
*Attorney, Agent, or Firm*—Oblon, Spivak, McClelland, Maier & Neustadt

[57] ABSTRACT

There is provided a heat-resistant, propylene resin-based molding material, comprising the following components (A) and (B):

component (A): 3 to 97% by weight of a resin-impregnated glass fiber bundle comprising:

constituent ($a^1$): 20 to 80 parts by weight of glass fibers having a length of at least 3 mm and an average diameter of 20 μm or less, and constituent ($a^2$): 80 to 20 parts by weight of a crystalline propylene polymer at least partly modified with an unsaturated carboxylic acid or a derivative thereof, the MFR of the modified polymer being 50 g/10 min or more, in which the glass fibers are present in the constituent ($a^2$) in such a state that they are arranged almost in parallel with one another; and component (B): 97 to 3% by weight of a crystalline propylene polymer having an MFR of 50 g/10 min or more.

7 Claims, No Drawings

HEAT-RESISTANT, PROPYLENE RESIN-BASED MOLDING MATERIALS AND MOLDED PRODUCTS OBTAINED THEREFROM

BACKGROUND OF THE INVENTION

1. Field of the Invention

This invention relates to heat-resistant, propylene resin-based molding materials which are excellent in moldability, and which can produce less warped, lightweight molded products having high heat resistance and high strength.

2. Background Art

Molded products obtained from a propylene resin are excellent in mechanical strength, processability and economical efficiency, so that they have been widely used in the field of industrial parts such as automotive parts. Further, in such a field where high rigidity and high heat resistance are especially required, high-performance composite materials composed of a propylene resin and an inorganic filler such as talc or glass fibers have been practically used. Such composite materials have been widely used, for example, for automotive parts, in particular, interior parts such as a trim and an instrument panel, exterior parts such as a bumper, and functional parts such as a fan shroud.

The conventional composite materials composed of a propylene resin and glass fibers possess a high level of heat resistance. However, there is a problem with the conventional composite materials that when they are subjected to injection molding and then cooled, the resulting molded product tends to thermally shrink to warp. As a method for preventing the molded product from warping, it is known to increase the fluidity of the composite molding material. It is also known to additionally use flat-shaped fillers such as talc and mica in the composite molding material. However, these methods are not satisfactory in that the prevention of warping in the molded product is insufficient, or in that the required use of a large amount of filler increases the density of the composition, leading to a heavier molded product.

It is therefore an object of the present invention to provide a propylene resin-based molding material which has high heat resistance and good moldability and which can produce lightweight molded products with very little warping.

SUMMARY OF THE INVENTION

It has now been found by the present inventors that the above object can be attained by using a specific resin-impregnated glass fiber bundle together with a specific propylene resin.

Thus, the present invention provides a heat-resistant, propylene resin-based molding material, comprising the following components (A) and (B):

component (A): 3 to 97% by weight of a resin-impregnated glass fiber bundle comprising:

constituent ($a^1$): 20 to 80 parts by weight of glass fibers having a length of at least 3 mm and an average diameter of 20 μm or less, and constituent ($a^2$): 80 to 20 parts by weight of a crystalline propylene polymer at least partly modified with an unsaturated carboxylic acid or a derivative thereof, the MFR of the modified polymer being 50 g/10 min or more, in which the glass fibers are present in the constituent ($a^2$) in such a state that they are arranged almost in parallel with one another; and component (B): 97 to 3% by weight of a crystalline propylene polymer having an MFR of 50 g/10 min or more.

The molding material of the present invention, because of its lightweight and its excellent heat resistance, moldability and anti-warping property, can be advantageously used for the production of various industrial parts, especially automotive parts for which lightweight, high level of heat resistance and dimensional stability upon molding are strongly desired.

SUMMARY OF THE INVENTION

G,4

[I] Heat-Resistant, Propylene Resin-Based Molding Material (1) Essential Components (A) Resin-impregnated Glass Fiber Bundle (Component (A))

The resin-impregnated glass fiber bundle, the component (A), comprises 20 to 80 parts by weight of glass fibers (constituent ($a^1$)) having a length of at least 3 mm and an average diameter of 20 μm or less, and 80 to 20 parts by weight of a crystalline propylene polymer (constituent ($a^2$)) at least partly modified with an unsaturated carboxylic acid or a derivative thereof, the MFR (melt flow rate) of modified polymer being 50 g/10 min or more. In the component (A), the glass fibers are present in the constituent ($a^2$) in such a state that they are arranged almost in parallel with one another, and generally from 100 to 8,000 fibers, preferably from 500 to 5,000 fibers are bound into a bundle to form a strand.

(a) Constituent ($a^1$)

The glass fibers, the constituent ($a^1$), have a length of at least 3 mm, preferably 5 to 20 mm, and an average diameter of 20 μm or less, preferably 1 to 17 μm, more preferably 3 to 14 μm.

When the length of the glass fibers is too short, the resulting molding material is poor in heat resistance and anti-warping properties. When the average diameter of the glass fibers is too large, the resulting molding material is poor in heat resistance and anti-warping properties. On the other hand, when the glass fibers are too thin, the resulting molding material has poor mechanical strength.

It is not necessary to apply, to the surface of the glass fiber, a binding agent, or a surface treating agent for improving the adhesion or compatibility between the glass fibers and the propylene resin. However, a surface treatment of the glass fibers with a silane coupling agent, for instance, an epoxy-silane such as γ-glycidoxypropyl trimethoxy silane, a vinyl-silane such as vinyltrichlorosilane or an amino-silane such as γ-aminopropyl triethoxy silane, can improve the heat resistance, strength and anti-warping properties of the resulting molding material.

(b) Constituent ($a^2$)

The modified crystalline propylene polymer, the constituent ($a^2$), is a crystalline propylene polymer at least partly modified with an unsaturated carboxylic acid or with a derivative thereof, the MFR of the modified polymer being 50 g/10 min or more.

Crystalline Propylene Polymer

Examples of the crystalline propylene polymer to be modified include propylene homopolymers; and block, random or graft copolymers of propylene with a minor amount of an α-olefin (for example, ethylene, butene, pentene, hexene, heptene, 4-methylpentene or octene), a vinyl ester (for example, vinyl acetate), an aromatic vinyl monomer (for example, styrene), or a vinylsilane (for example, vinyltrimethoxysilane or vinyltrimethylsilane); and mixtures thereof.

The MFR of the crystalline propylene polymer can be controlled either by the conditions for polymerization of the polymer or by a treatment using a peroxide.

Examples of the peroxide usable for the above treatment include peroxides such as methyl ethyl ketone peroxide and methyl isobutyl ketone peroxide; peroxyketals such as n-butyl-4,4-bis(t-butylperoxy)valerate; hydroperoxides such as cumene hydroperoxide and diisopropylhydrobenzene peroxide; dialkyl peroxides such as 1,3-bis(t-butylperoxy-isopropyl)benzene and dicumyl peroxide; percarbonates such as benzoyl peroxide and bis(4-t-butylcyclohexyl)peroxy dicarbonate; and peroxy esters such as t-butylperoxy acetate and t-butylperoxy laurate.

Of these crystalline propylene polymers, those polymers which contain a propylene homopolymer moiety having a density of $0.9080/cm^3$ or more are preferably used from the viewpoint of heat resistance.

Crystalline Propylene Polymer

G,6

Examples of the unsaturated carboxylic acid or a derivative thereof to be used for the modification of the above crystalline propylene polymer include unsaturated organic acids such as acrylic acid, methacrylic acid, maleic acid and itaconic acid; anhydrides of unsaturated organic acids such as maleic anhydride, itaconic anhydride and citraconic anhydride; esters of unsaturated organic acids such as methyl acrylate and monomethyl maleate; amides of unsaturated organic acids such as acrylic amide and fumaric monoamide; and imides of unsaturated organic acids such as itaconic imide.

Of these modifiers, acrylic acid and maleic anhydride are preferred from the viewpoint of the dispersibility and the reinforcing effect of the glass fibers. Maleic anhydride is most preferred.

The modification can be achieved by grafting the modifier onto the crystalline propylene polymer.

The amount of the modifier is generally from 0.01 to 20 parts by weight, preferably from 0.05 to 15 parts by weight, more preferably from 0.05 to 10 parts by weight for 100 parts by weight of the crystalline propylene polymer.

It is possible to adjust the degree of modification of the propylene polymer to a desired one by diluting a highly modified crystalline propylene polymer with non-modified one.

Modified Crystalline Propylene Polymer

The modified crystalline propylene polymer should have an MFR (JIS-K7210, 230° C., 2.16 kg) of 50 g/10 min or more, preferably 100 g/10 min or more, more preferably 200 g/10 min or more.

When the MFR of the modified crystalline propylene polymer is lower than 50 g/10 min, the reinforcing glass fibers cannot be uniformly dispersed in the resin-impregnated glass fiber bundle, whereby the resulting molding material has poor physical properties.

(c) Other Constituents (Optional Constituents)

Other constituents such as various resins, fillers and elastomers can also be incorporated into the resin-impregnated glass fiber bundle, the component (A), in such an amount that the advantages of the present invention are not appreciably impaired.

(d) Weight Ratio between the Constituents

The weight ratio between glass fibers (constituent ($a^1$)) and the modified crystalline propylene polymer (constituent ($a^2$)) in the resin-impregnated glass fiber strand is 20 to 80 (parts by weight):80 to 20 (parts by weight), preferably 40 to 80 (parts by weight):60 to 20 (parts by weight), more preferably 45 to 75 (parts by weight):55 to 25 (parts by weight), provided that the total of the constituents ($a^1$) and ($a^2$) is 100 parts by weight.

In the case where the ratio of the constituent ($a^2$) is too small, a molded product in which the glass fibers are poorly dispersed will be obtained. On the other hand, when the ratio of the constituent ($a^2$) is too large, the resulting molded product will have poor strength.

(e) Preparation of the Resin-impregnated Glass Fiber Bundle

As the starting glass fibers for the preparation of the resin-impregnated glass fiber bundle, continuous glass fibers (filaments) prepared by any known methods (as disclosed, for example, in British Patent No. 1,302,048 and U.S. Pat. No. 4,439,387) may preferably be used.

The subject bundle may be prepared by a method comprising the step of impregnating the continuous glass fibers (usually called "roving") with the modified crystalline propylene polymer, the constituent ($a^2$), while the glass fibers are being drawn.

More specifically, the continuous glass fibers are passed through a crosshead die attached to an extruder, while the modified crystalline propylene polymer in the molten state is supplied from a cylinder or the like to impregnate the glass fiber. The glass fiber strand thus obtained is cooled, and then cut into predetermined lengths.

(B) Crystalline Propylene Polymer (Component (B))

The same crystalline propylene polymer as is used as the above constituent ($a^2$) can be used as the crystalline propylene polymer, the component (B), having an MFR of 50 g/10 min or more. Thus, any one of the following polymers can be used as the component (B): propylene homopolymers; and block, random or graft copolymers of propylene with a minor amount of an α-olefin (for example, ethylene, butene, pentene, hexene, heptene, 4-methylpentene or octene), a vinyl ester (for example, vinyl acetate), an aromatic vinyl monomer (for example, styrene), or a vinylsilane (for example, vinyltrimethoxysilane or vinyltrimethylsilane); and mixtures thereof.

Of these crystalline propylene polymers, a propylene homopolymer (polypropylene) or a copolymer of propylene and ethylene is preferably used. It is particularly preferred to use a propylene-ethylene block copolymer of which the propylene homopolymer moiety has a density of $0.9080/cm^3$ or more. The MFR of the crystalline propylene polymer is preferably 100 g/10 min or more, more preferably 200 g/10 min or more. When the MFR is too low, the resulting molding material is poor in heat resistance, moldability and anti-warping properties.

Other components such as various resins, fillers and elastomers may be incorporated into the crystalline propylene polymer insofar as the advantages of the present invention are not significantly impaired. In particular, it is preferable to add, in advance, any of the below-described optional components to the propylene polymer when the qualities of the resulting molded product (warping and mechanical strength) are taken into consideration.

(2) Weight Ratio between Components (A) and (B)

In the heat-resistant, propylene resin-based molding material according to the present invention, the weight ratio between the resin-impregnated glass fiber bundle and the crystalline propylene polymer is 3 to 97 (% by weight):97 to 3 (% by weight), preferably 10 to 90 (% by weight):90 to 10 (% by weight), more preferably 20 to 80 (% by weight):80 to 20 (% by weight).

When the amount of the resin-impregnated glass fiber bundle is less than 3% by weight, the resulting molding material has poor heat resistance. On the other hand, when the amount is in excess of 97% by weight, the resulting molding material has poor moldability.

(3) Other Components (Optional Components)

Besides the above-described essential components (A) and (B), any of the conventional additives such as a pigment, an antioxidant, an antistatic agent, a flame-retardant and a dispersant may be incorporated into the molding material according to the present invention. Further, as component (C), use may also be made of a filler having an aspect ratio of 3 or more, or at least one elastomer selected from ethylene elastomers and styrene elastomers. These optional components may be used in combination.

The optional component (C) can be fed as it is to a molding machine together with the components (A) and (B). It is, however, preferred that the component (C) be blended with the component (B) in advance.

(a) Filler Having an Aspect Ratio of 3 or More (Component ($C^1$))

An inorganic or organic filler can be used as the filler having an aspect ratio of 3 or more. Specific examples of such a filler include talc, mica, carbon fibers, glass flakes, magnesium sulfate fibers, aluminum borate fibers, potassium titanate fibers, wollastonite, calcium carbonate fibers, titanium oxide fibers, and aromatic polyamide fibers. Of these, mica and glass flakes are preferably used. It is particularly preferable to use water-ground or wet-classified mica.

It is preferable to use a filler having an aspect ratio of 10 or more, particularly 15 or more.

Those fillers which are surface-treated with a surface active agent, a coupling agent, a metallic soap or the like may also be used. The above fillers, especially surface-treated fillers, can further improve the heat resistance, anti-warping properties, appearance and strength of the molded product.

(b) Elastomer Component (Component ($C^2$))

At least one elastomer selected from ethylene elastomers and styrene elastomers can be used as the elastomer component.

When such an elastomer component is used, the resulting molding material has improved impact strength and anti-warping properties.

Ethylene Elastomer

Examples of the ethylene elastomer include ethylene-propylene copolymer rubber (EPM), ethylene-propylene-diene terpolymer rubber (EPDM), ethylene-butene-1 copolymer rubber (EBM) and ethylene-propylene-butene-1 terpolymer rubber (EPBM). These elastomers can be used in combination.

In the case of the above ethylene-propylene copolymer rubber, it is preferable to use one having a propylene content of 20 to 55% by weight and a Mooney viscosity ($ML_{1+4}100°$ C.) of less than 100, preferably less than 50.

In the case of the above ethylene-propylene-diene terpolymer rubber, it is preferable to use one having an iodine value of 20 or less.

In the case of the above ethylene-propylene-butene-1 terpolymer rubber, it is preferable to use one having a propylene content of 5 to 50% by weight and a butene content of 5 to 50% by weight.

Styrene Elastomer

Examples of the styrene elastomer include hydrogenated styrene-butadiene block copolymers and hydrogenated styrene-isoprene block copolymers, more specifically, fully or partially hydrogenated styrene-butadiene and styrene-isoprene block copolymers, such as a styrene-ethylene/butylene-styrene block copolymer, a styrene-ethylene/propylene block copolymer and a styrene-ethylene/propylene-styrene block copolymer. It is preferable to use those styrene elastomers which have a degree of hydrogenation of 95% or more, particularly 99% or more. Further, it is preferable to use those styrene elastomers which have a styrene content of 5 to 50% by weight, particularly 15 to 40% by weight.

(c) Amount of Component (C)

The above-described filler or elastomer may be used generally in an amount of 50 parts by weight or less, preferably from 3 to 50 parts by weight, more preferably from 5 to 30 parts by weight for 100 parts by weight of the total of the components (A) and (B).

When the amount of the filler is in excess of 50 parts by weight, the resulting molding material has poor moldability. In addition, the density of the molding material becomes high, so that the weight of the resulting molded product becomes large. When the amount of the elastomer is in excess of 50 parts by weight, the resulting molding material has poor heat resistance.

(4) Production of the Molding Material

The heat-resistant, propylene resin-based molding material can be obtained by blending the above-described essential components (A) and (B) and, according to necessity, the above optional component (C).

It is preferred that the component (B) or a mixture of the components (B) and (C) be kneaded and granulated in advance, using an ordinary kneading machine such as a single-screw extruder, a twin-screw extruder, a Banbury mixer, a roller, a Brabender Plastograph or a kneader, although it is possible to directly feed it as it is along with the component (A) to a molding machine.

When the kneading and granulation of a mixture of the components (B) and (C) is conducted, as the case may be, it may be conducted in a stepwise manner in view of the properties of the resulting molding material. Thus, for example, all of the component (B) and a part of the component (C) is first kneaded, the remainder of component (C) is then added, and the resulting mixture is further kneaded and granulated.

Kneading is conducted at a temperature of generally from 190° to 250° C., preferably from 200° to 240° C.

When the above-described surface-treating agent for component (C)($C_1$) is used, this agent may be added at the time of kneading of components (B) and (C). In this case, the kneading and surface treatment of component (C) can be conducted at the same time.

The molding material thus obtained generally has an MFR of 20 g/10 min or more, and thus exhibits good moldability.

[II] Molded Product (1) Molding

Molded products can be obtained from the heat-resistant, propylene resin-based molding material by various molding methods such as injection molding, compression molding, and extrusion molding (sheet-extrusion, blow molding). Among others, injection molding and press-injection molding are preferred since these methods can best make use of the advantageous properties of the molding material.

(2) Intended Use

The molded products obtained from the heat-resistant, propylene resin-based molding material, according to the present invention have excellent heat resistance and strength, exhibits very little warping, and are light in weight. They preferably have a density of 1.10 g/cm³ or less. Therefore, they can be advantageously used as various industrial parts, in particular, as high-functional or large-sized molded products, for example, automotive exterior and interior parts such as a bumper, a fender, a spoiler, an instrument panel, a trim, a fan shroud and a glove compartment; parts of household electric appliances, such as a TV cabinet, a VTR cabinet, a washing machine cover and a vacuum cleaner housing; and parts of audio appliances such as a stereo case.

[III] Experimental Examples

The following examples further illustrate the present invention but are not intended to limit it.

In the examples, the following measurements were conducted:

Heat Resistance

The flexural modulus of a test piece of molded product was measured in accordance with JIS-K7203 at a temperature of 100° C.

Warping in Molded Product

A discal sheet (200 φ×2.0 mmt) was prepared by injection molding (with a pin gate). The degree of warping (deformation) of the sheet was measured in the following manner: While one end of the discal sheet placed on a mold platen was being pressed down, the degree of warping of the sheet, that is, the degree of lifting of the opposite end of the sheet from the mold platen was measured with a clearance gauge and a slide caliper.

Density

The density of a sheet (120×120×3 mm) obtained by injection molding was measured in accordance with JIS-K 7112.

MFR of Molded Product

The same sheet as used in the measurement of density was crushed, and the MFR was measured in accordance with JIS-K7210 (230° C., 2.16 kg). It is considered that the moldability is better as this value is higher.

The following starting materials are used in the examples:
(a) Component (A)
(A)-1: 50 parts by weight of a propylene homopolymer modified With maleic anhydride (0.08% by weight), having an MFR of 230 g/10 min and a density of 0.9083 g/cm³, and 50 parts by weight of continuous glass fibers having an average diameter of 10 μm, surface-treated with γ-aminopropyl triethoxy silane were fed to an extruder. Glass fibers were impregnated with the modified propylene homopolymer while they were being drawn at the crosshead part of the extruder heated to a temperature of 200° C. The glass fiber strand thus obtained was cooled, and then cut into a length of 12 mm to obtain pellets of a resin-impregnated glass fiber bundle.

(A)-2: 30 parts by weight of a propylene-ethylene block copolymer modified with maleic anhydride (0.09% by weight), having an MFR of 250 g/10 min, a density of 0.9081 g/cm³ and an ethylene content of 3% by weight, and 70 parts by weight of continuous glass fibers having an average diameter of 10 μm, surface-treated with γ-glycidoxypropyl triethoxy silane were fed to an extruder. The glass fibers were impregnated with the modified propylene-ethylene block copolymer while they were being drawn at the crosshead part of the extruder heated to a temperature of 200° C. The glass fiber strand thus obtained was cooled, and then cut into a length of 12 mm to obtain pellets of a resin-impregnated glass fiber bundle.

(A)-3: 50 parts by weight of a propylene homopolymer modified with maleic anhydride (0.09% by weight), having an MFR of 30 g/10 min and a density of 0.9082 g/cm³, and 50 parts by weight of continuous glass fibers having an average diameter of 17 μm, surface-treated with γ-aminopropyl triethoxy silane were fed to an extruder. The glass fibers were impregnated with the modified propylene homopolymer while they were being drawn at the crosshead part of the extruder heated to a temperature of 200° C. The glass fiber strand thus obtained was cooled, and then cut into a length of 12 mm to obtain pellets of a resin-impregnated glass fiber bundle.

(A)-4: 30 parts by weight of a propylene-ethylene block copolymer modified with acrylic acid (0.7% by weight), having an MFR of 40 g/10 min, a propylene homopolymer moiety whose density is 0.9079 g/cm³ and an ethylene content of 3% by weight, and 70 parts by weight of continuous glass fibers having an average diameter of 17 μm, surface-treated with γ-glycidoxypropyl trimethoxy silane were fed to an extruder. The glass fibers were impregnated with the modified propylene-ethylene block copolymer while they were being drawn at the crosshead part of the extruder heated to a temperature of 200° C. The strand thus obtained was cooled, and then cut into a length of 12 mm to obtain pellets of a resin-impregnated glass fiber bundle.

(A)-5: 80 parts by weight of a propylene homopolymer modified with maleic anhydride (0.08% by weight), having an MFR of 230 g/10 min and a density of 0.9083 g/cm³, and 20 parts by weight of chopped glass fiber strands having an average diameter of 10 μm and a length of 6 mm, surface-treated with γ-aminopropyl triethoxy silane were fed to a twin-screw extruder (the glass fibers were separately fed at the latter half part of the extruder), and kneaded at 200° C. and granulated to obtain pellets.

(b) Component (B), or Component (B) Containing Component (C)
(B)-1: Pellets of a propylene homopolymer having an MFR of 210 g/10 min and a density of 0.9082 g/cm³.

(B)-2: Pellets obtained by feeding 78 parts by weight of a propylene-ethylene block copolymer (component (B)) having an MFR of 340 g/10 min adjusted by the treatment with a peroxide, 1,3-bis(t-butylperoxyisopropyl)benzene, a propylene homopolymer moiety whose density is 0.9080 g/cm³ and an ethylene content of 3% by weight, and 22 parts by weight of water-ground mica (component (C)) having an aspect ratio of 18 and an average particle size of 35 μm to a twin-screw extruder (the mica was separately fed at the latter half part of the extruder), and kneading at 200° C. and granulating them.

(B)-3: Pellets obtained by feeding 75 parts by weight of the same propylene-ethylene block copolymer as used in (B)-2 above (component (B)), and 25 parts by weight of an ethylene-propylene copolymer rubber (component (C)) having a propylene content of 3% by weight and a Mooney viscosity (ML$_{1+4}$100° C.) of 18 to a twin-screw extruder, and kneading at 200° C. and granulating them.

(B)-4: Pellets obtained by feeding 63 parts by weight of the same propylene-ethylene block copolymer as used in (B)-2 (component (B)); 12 parts by weight of the same mica as used in (B)-2 (component (C)); and 25 parts by weight of a styrene-ethylene/butylene-styrene block copolymer (component (C)) having a styrene content of 20% by weight, a number-average molecular weight of 30,000 and an MFR (230° C., 2.16 kg) of 150 g/10 min to a twin-screw extruder (the mica was separately fed at the latter half part of the extruder), and kneading at 200° C. and granulating them.

(B)-5: Pellets of a propylene homopolymer (component (B)) having an MFR of 30 g/10 min and a density of 0.9080 g/cm³.

(B)-6: Pellets obtained by feeding 63 parts by weight of a propylene-ethylene block copolymer (component (B)) having an MFR of 40 g/10 min, a propylene homopolymer moiety whose density is 0.9076 g/cm³ and an ethylene content of 3% by weight; 12 parts by weight of the same mica as used in (B)-4; and 25 parts by weight of the same styrene-ethylene/butylene-styrene block copolymer as used in (B)-4 (component (C)) to a twin-screw extruder (the mica was separately fed at the latter half part of the extruder), and kneading at 200° C. and granulating them.

EXAMPLES 1–4 AND COMPARATIVE EXAMPLES 1–3

The above-described components (A)-1 to (A)-5 and components (B)-1 to (B)-6 were dry-blended as shown in Table 1. Each mixture obtained was fed to a screw-in-line type injection molding machine, and discal sheets for the measurement of warping and test pieces for the measurements of physical properties were prepared by molding at a temperature of 220° C. The molding cycle was 45 seconds.

The results of the above measurements are shown in Table 1.

TABLE 1

| | Formulation | | | | Evaluation | | | |
|---|---|---|---|---|---|---|---|---|
| | Component (A): Resin-impregnated glass fiber bundle | | Component (B), or component (B) containing component (C): Crystalline propylene polymer, etc. | | Heat resistance [flexural modulus at 100° C.] | Warping | Density | MFR of molded product |
| | Type | wt % | Type | wt % | (kg/cm³) | (mm) | (g/cm³) | (g/10 min) |
| Example 1 | (A)-1 | 40 | (B)-1 | 60 | 28,400 | 2.2 | 1.03 | 23 |
| Example 2 | (A)-1 | 20 | (B)-2 | 80 | 24,700 | 0.5 | 1.10 | 31 |
| Example 3 | (A)-2 | 30 | (B)-3 | 70 | 21,900 | 1.0 | 1.04 | 38 |
| Example 4 | (A)-2 | 20 | (B)-4 | 80 | 21,000 | 0.8 | 1.06 | 45 |
| Comp. Example 1 | (A)-3 | 40 | (B)-5 | 60 | 20,300 | 9.3 | 1.03 | 5 |
| Comp. Example 2 | (A)-4 | 20 | (B)-6 | 80 | 18,300 | 5.8 | 1.06 | 8 |
| Comp. Example 3 | (A)-5 | 100 | — | — | 24,900 | 12.5 | 1.03 | 16 |

As is apparent from the data shown in Table 1, the injection-molded products obtained from the resin compositions shown in Examples 1 to 4 have excellent heat resistance and moldability, had extremely small warping, and are light in weight.

In contrast, the molded products obtained from the resin compositions shown in Comparative Examples 1 to 3 are poor in heat resistance or in warping.

What is claimed is:

1. A heat resistant, propylene resin-based molding material, comprising the following components (A) and (B):

component (A): 3 to 97% by weight of a resin-impregnated glass fiber bundle comprising:

constituent ($a^1$): 20 to 80 parts by weight of glass fibers having a length of at least 3 mm and an average diameter of 20 μm or less, and constituent ($a^2$): 80 to 20 parts by weight of a crystalline propylene polymer at least partly modified with an unsaturated carboxylic acid or a derivative thereof, the MFR of the modified polymer being 50 g/10 min or more, said resin-impregnated glass fiber bundle being prepared by a method comprising the steps of impregnating continuous glass fibers with the modified crystalline propylene polymer while said glass fibers are being drawn and cutting the resin-impregnated glass fibers into a predetermined length in which the glass fibers are present in the constituent ($a^2$) in such a state that they are arranged almost in parallel with one another; and component (B): 97 to 3% by weight of a crystalline propylene polymer having an MFR of 50 g/10 min or more.

2. The heat-resistant, propylene resin-based molding material according to claim 1, further comprising a filler having an aspect ratio of 3 or more in an amount of 50 parts by weight or less for 100 parts by weight of the total of the components (A) and (B).

3. The heat-resistant, propylene resin-based molding material according to claim 2, wherein the MFR of the crystalline propylene polymer as the component (B) is 200 g/10 min or more, and the aspect ratio of the filler is 15 or more.

4. The heat-resistant, propylene resin-based molding material according to claim 1, further comprising at least one elastomer selected from the group consisting of ethylene elastomers and styrene elastomers in an amount of 50 parts by weight or less for 100 parts by weight of the total of the components (A) and (B).

5. The heat-resistant, propylene resin-based molding material according to claim 1, having an MFR of 20 g/10 min or more.

6. A molded product obtained from the heat-resistant, propylene resin-based molding material according to claim 1.

7. The molded product according to claim 6, having a density of 1.10 g/cm³ or less.

* * * * *